(12) United States Patent
Wang et al.

(10) Patent No.: US 8,509,623 B2
(45) Date of Patent: Aug. 13, 2013

(54) OPTICAL LNB CAPABLE OF FAST POSITION-ADJUSTING

(75) Inventors: Che-Ming Wang, Hsinchu (TW); Chih-Chang Ko, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 356 days.

(21) Appl. No.: 12/969,535

(22) Filed: Dec. 15, 2010

(65) Prior Publication Data

US 2012/0099869 A1 Apr. 26, 2012

(30) Foreign Application Priority Data

Oct. 26, 2010 (TW) .............................. 99136507 A (51) Int. Cl.
*H04B 10/00* (2013.01)
(52) U.S. Cl.
USPC ........... 398/121; 398/115; 398/116; 398/118; 398/125
(58) Field of Classification Search
USPC ................. 398/115, 116, 117, 118, 120, 121, 398/398/125, 127, 128, 130, 122, 152, 140, 398/141, 163, 65
See application file for complete search history.

(56) References Cited

U.S. PATENT DOCUMENTS 6,486,907 B1 * 11/2002 Farber et al. ..................... 725/78
8,305,277 B2 * 11/2012 Reams .......................... 343/704
2011/0283330 A1 * 11/2011 Wang .............................. 725/69

* cited by examiner

*Primary Examiner* — M. R. Sedighian
(74) *Attorney, Agent, or Firm* — Winston Hsu; Scott Margo (57) ABSTRACT

An optical LNB capable of fast position-adjusting is employed in an LNBF. The optical LNB includes a down-converting device coupled to an OMT of the LNBF for down-converting a polarized signal for generating a first intermediate frequency signal, a branching device for branching the first intermediate frequency signal for generating a second and a third intermediate frequency signals, an electrical/optical converting device coupled to the branching device for converting the second intermediate frequency signal into an optical signal, and a power end for receiving power from a power supply and outputting the third intermediate frequency signal.

7 Claims, 9 Drawing Sheets

FIG. 5F

OPTICAL LNB CAPABLE OF FAST POSITION-ADJUSTING

BACKGROUND OF THE INVENTION

1. Field of the Invention

The present invention relates to a satellite communication receiving system, and more particularly, to a satellite communication receiving system capable of fast position-adjusting.

2. Description of the Prior Art

Satellite communication technology has advantages of wide coverage area and long distance linking, which is applied in many domains, such as in satellite broadcasts or communication systems. Thus, wherever you are (even on the ocean or in the desert), the satellite signal may be received by a corresponding antenna.

Figure 1:
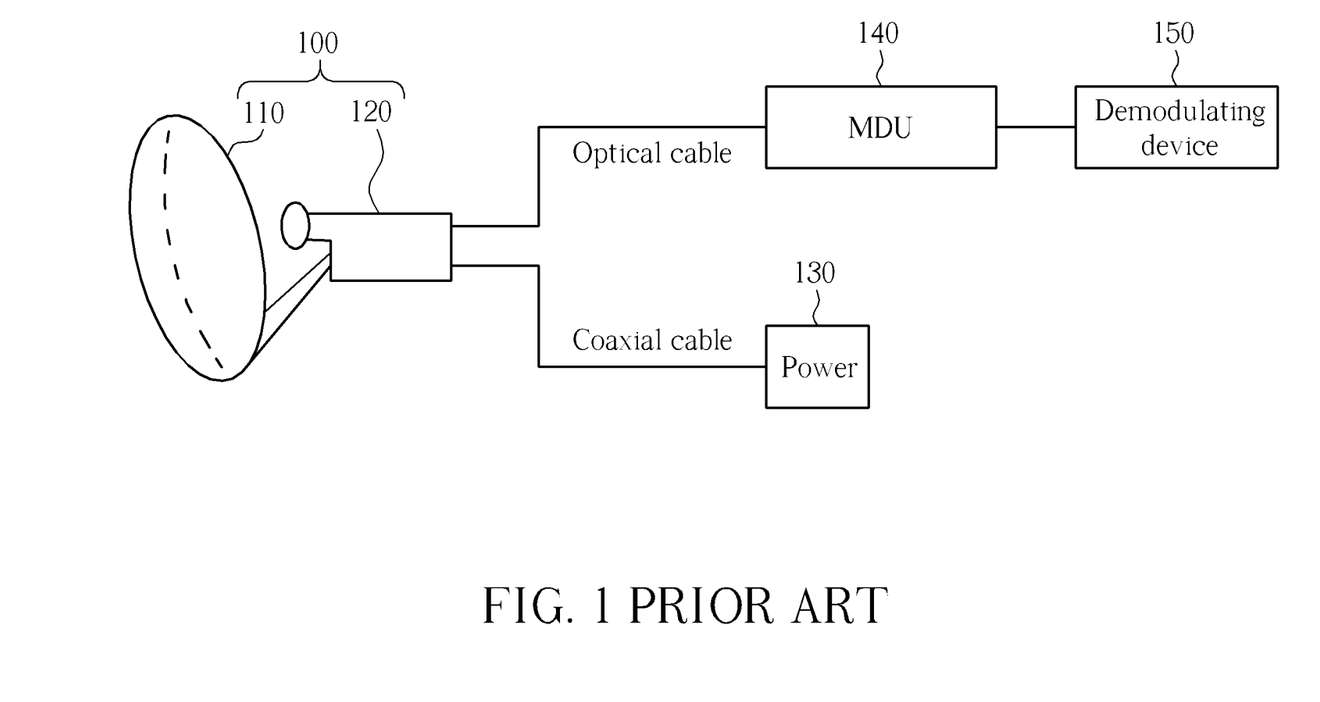
FIG. 1 is a diagram illustrating a satellite communication receiving system in the prior art during position-adjusting.

Please refer to FIG. 1. FIG. 1 is a diagram illustrating a satellite communication receiving system 100 in the prior art during position-adjusting. The satellite communication receiving system 100 comprises a dish antenna 110, a Low Noise Block Down-converter with Integrated Feed (LNBF) 120, and a power supply 130. In the satellite communication receiving system 100, the paraboloid dish antenna 110 reflects the satellite signal onto the LNBF 120 located on the focal point of the dish antenna 110. The satellite signal is polarized and down-converted to an intermediate frequency (IF) signal by the LNBF 120. After that, the IF signals are converted to optical signals and outputted through an optical fiber cable. The power supply 130 provides power to the LNBF 120 through a coaxial cable. In the prior art, when an engineer installs the dish antenna 110 and adjusts the position of the dish antenna 110 for the satellite, a multiple dwelling unit (MDU) 140 has to be utilized for converting the optical signals outputted by the LNBF 120 to electrical signals and transmitting the electrical signals to the demodulating device 150, e.g. set-top box (STB). In this way, the engineer can determine if the position of the dish antenna 110 is correct. However, generally the satellite communication receiving system 100 is disposed on the roof or the exterior wall of a building, where no power socket or power source is available, and therefore the engineer has to use power from the interior of the building for powering the MDU 140. Such environmental disadvantage increases the difficulty for the installation and thus the time required for adjusting the satellite communication receiving system 100 to the correct position prolongs as well.

SUMMARY OF THE INVENTION

The present invention provides an optical Low Noise Block down-converter (LNB) capable of fast position-adjusting utilized in a Low Noise Block Down-converter with Integrated Feed (LNBF) of a satellite communication receiving system. The optical LNB comprises a down-converting device, coupled to an Orthomode Transducer (OMT) of the LNBF, for down-converting a polarized signal so as to generate a first Intermediate Frequency (IF) signal; a branching device, for branching the first IF signal, so as to generate a second and a third IF signals; an electrical/optical converting device, coupled to the branching device, for converting the second IF signal to an optical signal; and a power end for receiving power and outputting the third IF signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
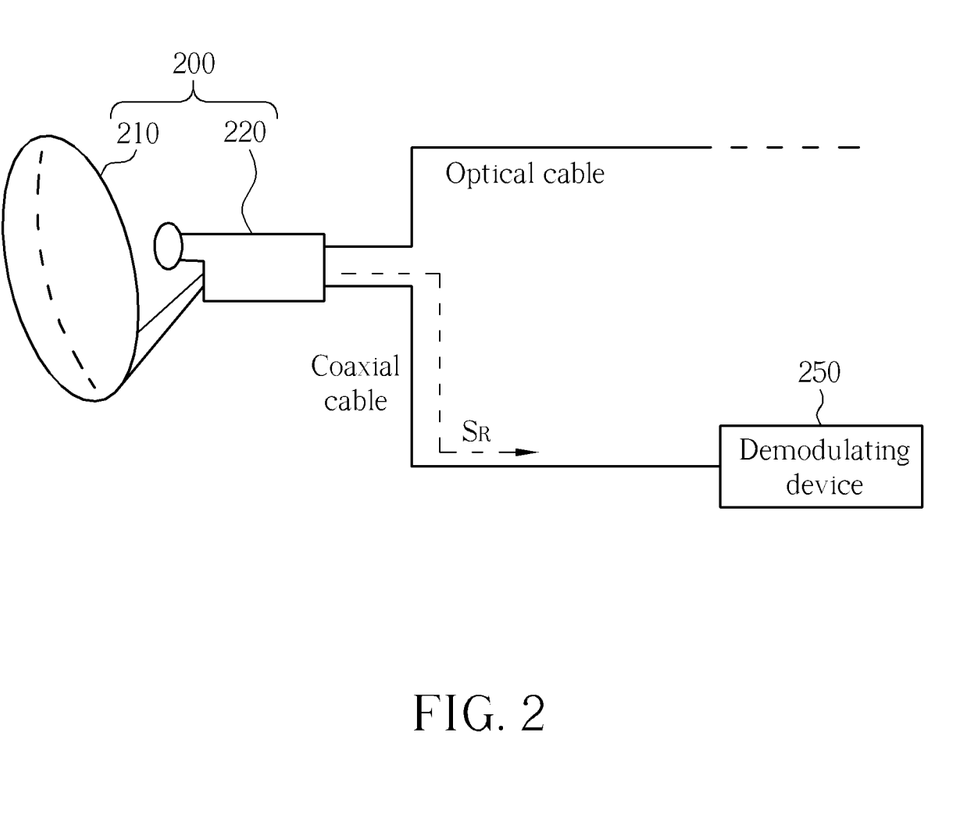
FIG. 2 is diagram illustrating a satellite communication receiving system of the present invention during position-adjusting.

Please refer to FIG. 2. FIG. 2 is diagram illustrating a satellite communication receiving system 200 of the present invention during position-adjusting. The satellite communication receiving system 200 comprises a dish antenna 210 and a LNBF 220. The LNBF 220 receives power from the demodulating device 250 through the coaxial cable and the power end of the LNBF 220. The LNBF 220 polarizes the satellite signals received by the dish antenna 210, down-converts the polarized signals to the IF signals, converts the IF signals to optical signals, and outputs the optical signals through the optical fiber cable. Additionally, the LNBF 220 also outputs the IF signals through the power end of the LNBF 220 and the coaxial cable. In this way, when the engineer execute position-adjusting for the dish antenna 210, the IF signals transmitted through the coaxial cable can be transmitted to the demodulating device 250, and the engineer can determine if the position of the dish antenna 210 is correct simply by the signal output from the demodulating device 250, without the need of optical/electrical conversion by the MDU.

Simply speaking, since in the satellite communication receiving system 200, the LNBF 220 directly outputs the IF signals through the power end of the LNBF 220 and the coaxial cable, the engineer can determine if the position of the dish antenna 210 is correct simply according to the signal output from the demodulating device 250. In such condition, the MDU is no longer required for optical/electrical conversion. More importantly, the engineer executes position-adjusting with convenience.

Figure 3:
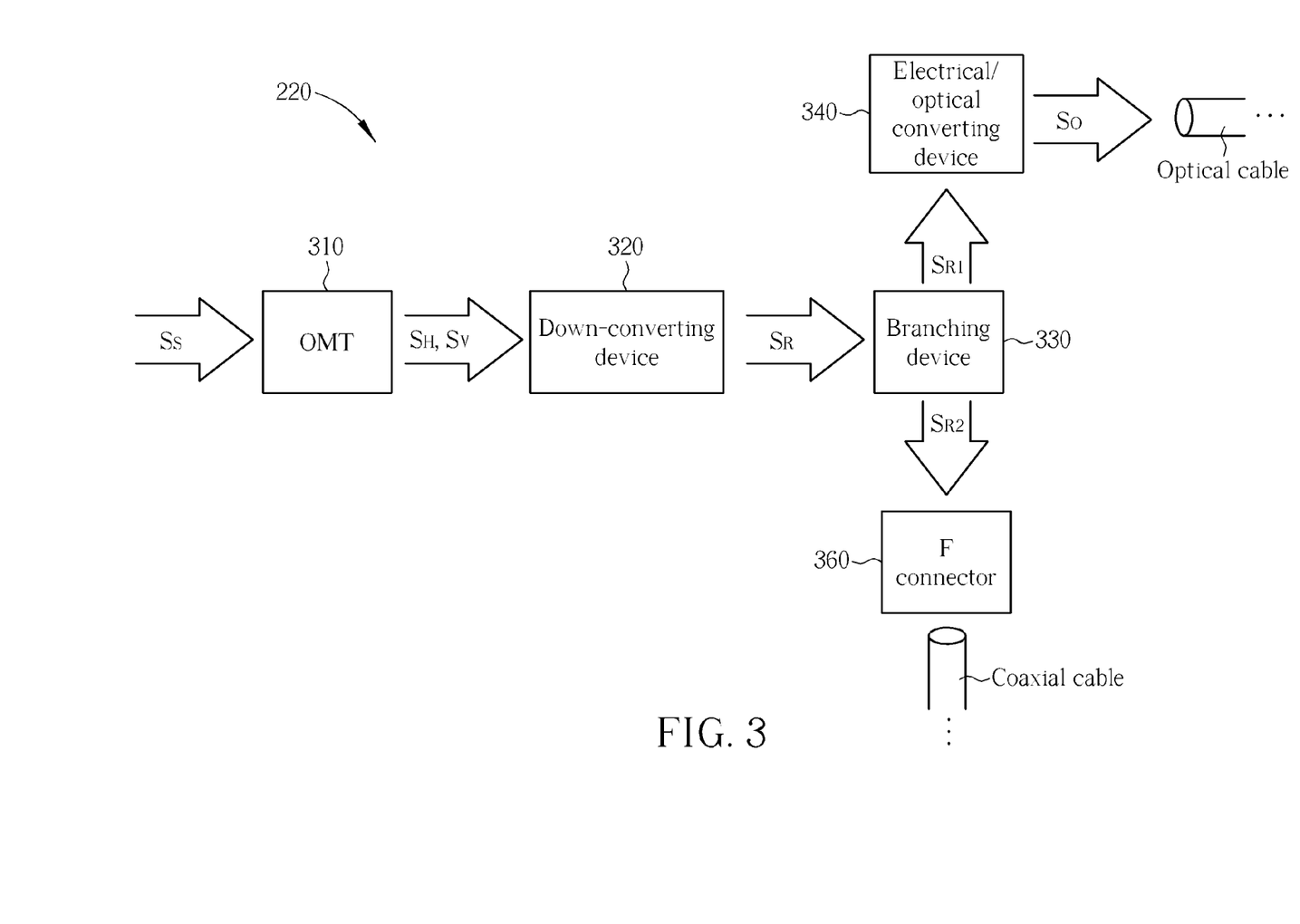
FIG. 3 is a functional block diagram illustrating the LNBF of the satellite communication receiving system of the present invention.

Please refer to FIG. 3. FIG. 3 is a functional block diagram illustrating the LNBF 220 of the satellite communication receiving system 200. As shown in FIG. 3, the LNBF 220 comprises an Orthomode Transducer (OMT) 310, a down-converting device 320, a branching device 330, and an electrical/optical converting device 340. Additionally, the LNBF 220 comprises a feedhorn for receiving the satellite signals reflected by the dish antenna 210. The OMT 310 polarizes the satellite signal $S_S$ into the vertical polarized signal $S_V$ and the horizontal polarized signal $S_H$. The down-converting device 320 down-converts the vertical polarized signal $S_V$ and the horizontal polarized signal $S_H$ to an IF signal $S_R$ within a predetermined frequency band. The branching device 330 branches the IF signal $S_R$ to the IF signals $S_{R1}$ and $S_{R2}$. The IF signals $S_{R1}$ and $S_{R2}$ are equivalent to the IF signal $S_R$, wherein the IF signal $S_{R1}$ is provided to the electrical/optical converting device 340 for converting to the optical signal $S_O$, and the optical signal $S_O$ is outputted to the optical fiber coaxial cable. The IF signal $S_{R2}$ is outputted to the coaxial cable through an F connector 360. In this way, the engineer can connect the demodulating device 250 to the coaxial cable carrying the IF signal $S_{R2}$ for position-adjusting. Additionally, preferably, the IF signal $S_{R2}$ is carried on the coaxial cable which connects the LNBF 220 and the power supply 130.

Figure 4:
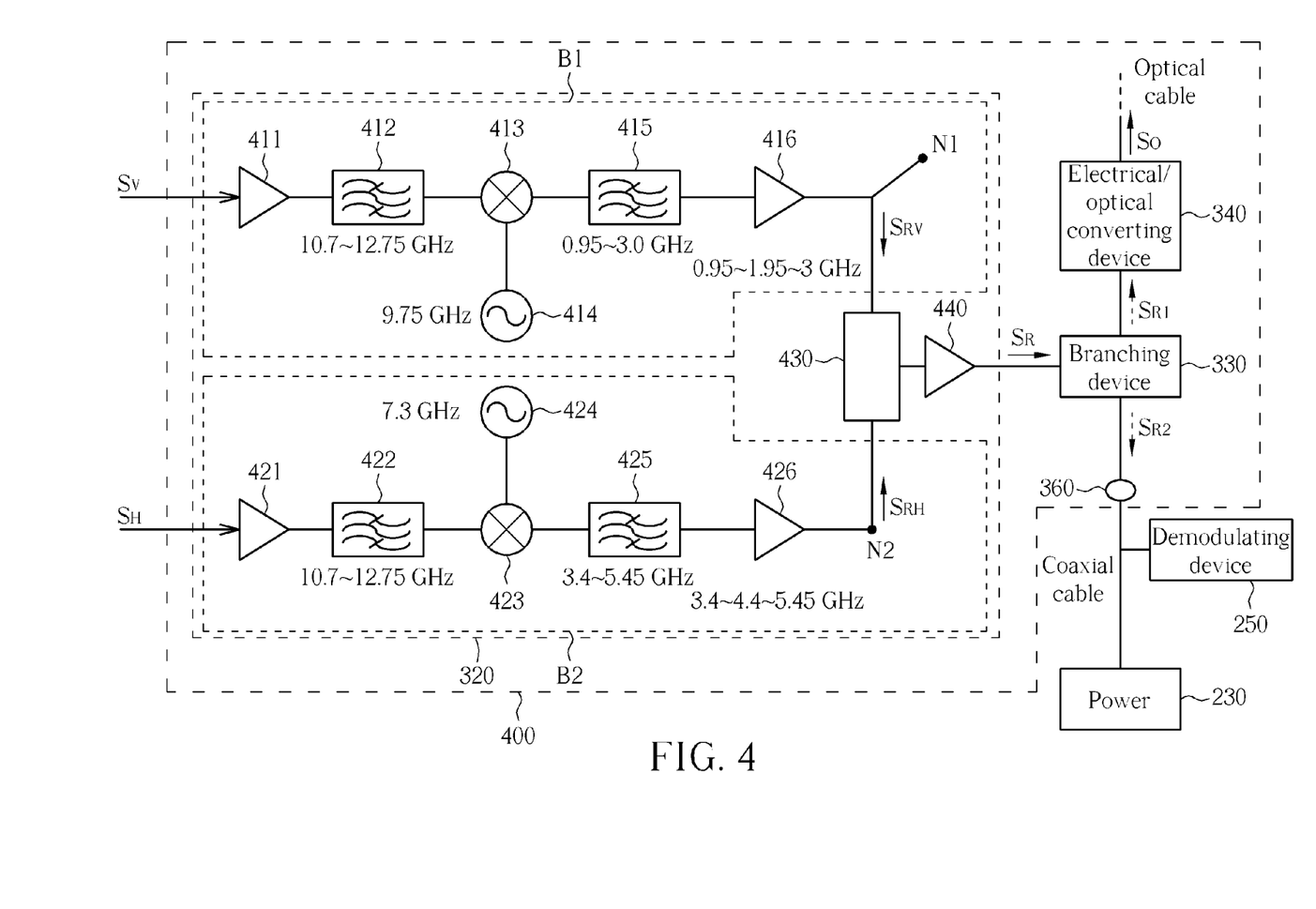
FIG. 4 is a diagram illustrating an embodiment of the down-converting device in FIG. 3.
Figure 5A:
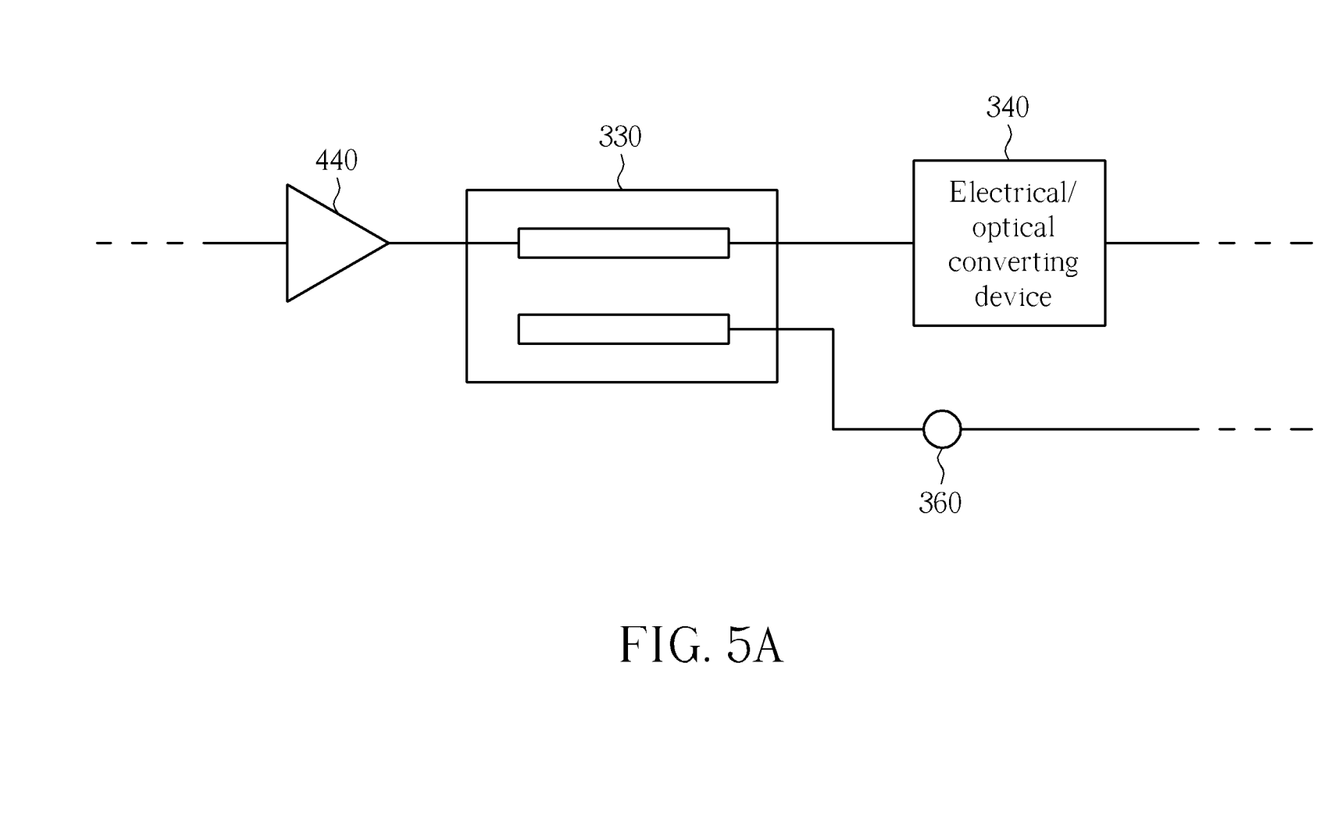
FIG. 5A through FIG. 5G are diagrams illustrating different embodiments of the branching device in FIG. 4.
Figure 5B:
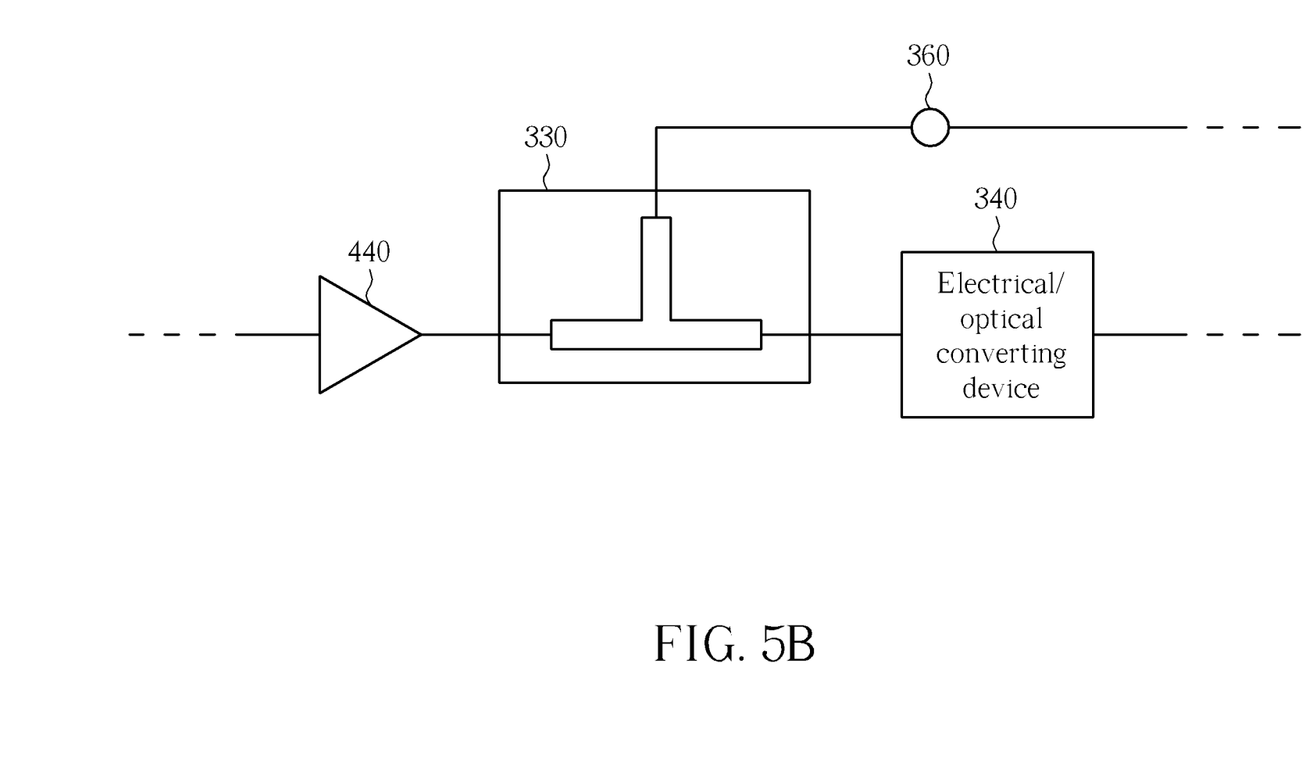
Figure 5C:
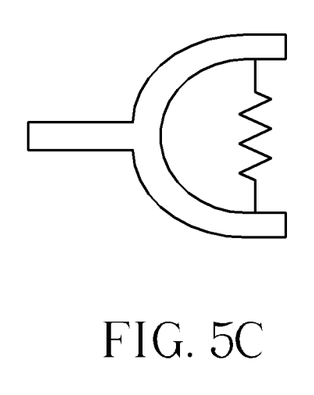
Figure 5D:
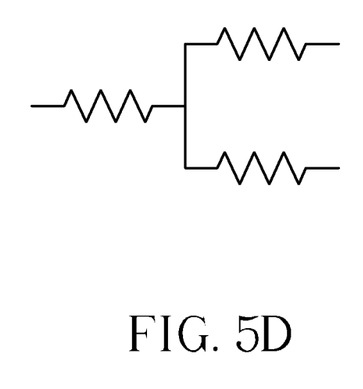
Figure 5E:
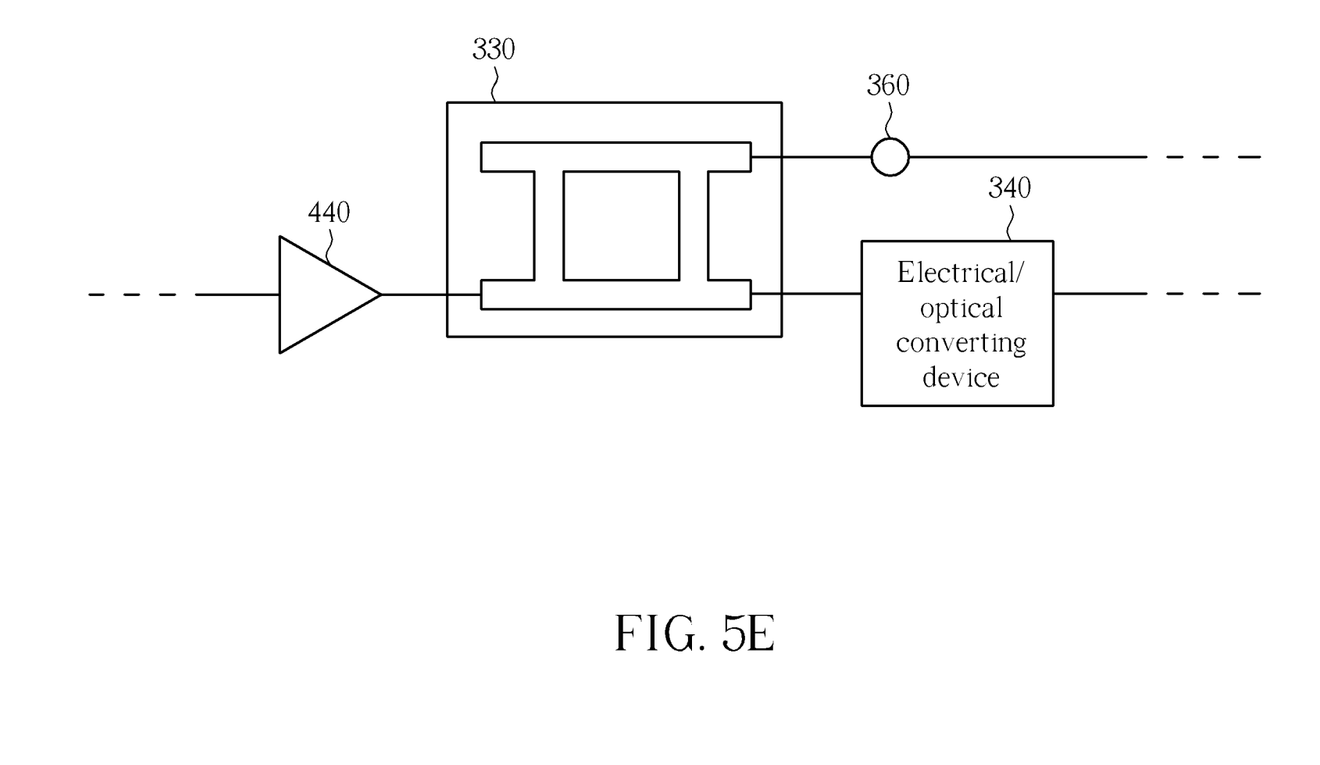
Figure 5F:
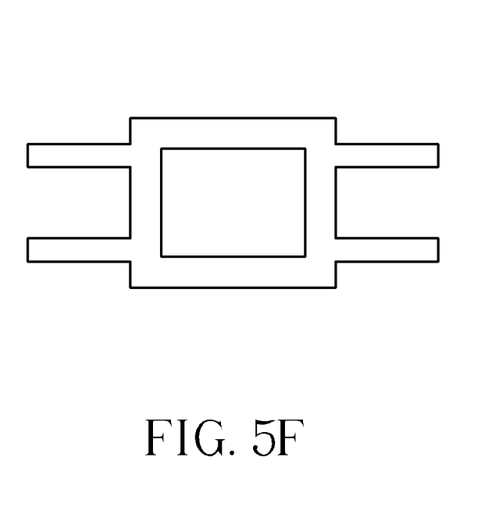
Figure 5G:
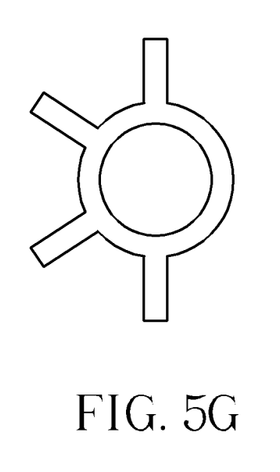

It is noticeable that FIG. 3 only describes the functions of the LNBF 220, and the detailed realization for the LNBF 220 should be modified according to the system requirement. For example, please refer to FIG. 4. FIG. 4 is a diagram illustrating an embodiment of the down-converting device 320 in FIG. 3. As shown in FIG. 4, the down-converting device 320 comprises two down-converting circuits $B_1$ and $B_2$, an IF diplexer 430, and an amplifier 440. The down-converting circuits $B_1$ and $B_2$ down-convert the vertical and the horizontal polarized signals $S_V$ and $S_R$ to a predetermined frequency band, e.g. 0.95 GHz~1.95 GHz~3.0 GHz and 3.4 GHz~4.4 GHz~5.45 GHz. More specifically, in the down-converting circuit $B_1$, the vertical polarized signal $S_V$ passes the low-noise amplifier 411 and the band-pass filter 412 with the pass-band of 10.7~12.75 GHz, then passes the mixer 413 for mixing with the oscillation signal with frequency of 9.75 GHz generated from the oscillator 414, and finally passes the band-pass filter 415 with the pass-band of 0.95~3 GHz and the IF amplifier 416, to output an IF signal $S_{RV}$. In the down-converting circuit $B_2$, the horizontal polarized signal $S_H$ passes the low-noise amplifier 421 and the band-pass filter 422 with the pass-band of 10.7~12.75 GHz, then passes the mixer 423 for mixing with the oscillation signal with frequency of 7.3 GHz generated from the oscillator 424, and finally passes the band-pass filter 425 with the pass-band of 3.4~5.45 GHz and the IF amplifier 426, to output an IF signal $S_{RH}$. The IF diplexer 430 combines the IF signals $S_{RV}$ and $S_{RH}$ and transmits to the amplifier 440 so that the amplifier 440 accordingly outputs the IF signal SR to the branching device 330.

Besides, for product integrity, the down-converting device 320 can be integrated with the electrical/optical converting device 340 and the branching device 330, as an Optical Low Noise Block Down-converter (Optical LNB) 400. By the above integration, the optical LNB 400 not only has the functions of down-converting and converting the IF signals to optical signals for output, but also is able to directly output the IF signals through the power ends for position-adjusting.

On the other hand, in the present invention, the disposition of the branching device 330 can be varied. Since the signals outputted from the branching device 330 are provided for position-adjusting, and in fact, the IF signals $S_{RV}$ or $S_{RH}$ in FIG. 4 can be also utilized for position-adjusting, the branching device 330 can be accordingly disposed at the nodes $N_1$ or $N_2$ for branching the IF signals $S_{RV}$ or $S_{RH}$ respectively.

Moreover, because the branching device 330 is only used for branching the IF signal $S_R$, the realization of the branching device 330 should be well-known to those skilled in the art. For example, please refer to FIG. 5A through 5G. FIG. 5A through FIG. 5G are diagrams illustrating different embodiments of the branching device 330 in FIG. 4, which respectively represent a direct coupler, a T-type power divider, a resistant power divider, a Wilkinson power divider, a quadrature hybrid power divider, and a ring hybrid power divider. It is also noticeable that the realizations of the branching device 330 can be designed according to user requirements and should not be limited to only embodiments disclosed in FIG. 5A to FIG. 5G.

To sum up, by the satellite communication receiving system of the present invention, when a engineer executes position-adjusting, he/she can directly reads the IF signals outputted from the LNBF through the demodulating device for determining if the dish antenna is in the correct position, without the need of the MDU for optical/electrical conversion, which provides great convenience.

Those skilled in the art will readily observe that numerous modifications and alterations of the device and method may be made while retaining the teachings of the invention.

What is claimed is:

1. An optical Low Noise Block down-converter (LNB) capable of fast position-adjusting utilized in a Low Noise Block Down-converter with Integrated Feed (LNBF) of a satellite communication receiving system, the optical LNB comprising:
    a down-converting device, coupled to an Orthomode Transducer (OMT) of the LNBF, for down-converting a polarized signal so as to generate a first Intermediate Frequency (IF) signal;
    a branching device, for branching the first IF signal, so as to generate a second and a third IF signals;
    an electrical/optical converting device, coupled to the branching device, for converting the second IF signal to an optical signal; and
    a power end for receiving power and outputting the third IF signal.

2. The optical LNB of claim 1, wherein the second and the third IF signals are identical to the first IF signal.

3. The optical LNB of claim 1, wherein the polarized signal is a vertical polarized signal or a horizontal polarized signal.

4. The optical LNB of claim 1, wherein the polarized signal comprises a vertical polarized signal and a horizontal polarized signal, and the down-converting device comprises:
    a first down-converting circuit for down-converting the vertical polarized signal so as to output a fourth IF signal;
    a second down-converting circuit for down-converting the horizontal polarized signal so as to output a fifth IF signal; and
    a diplexer, coupled to the first and the second down-converting circuits and the branching device, for combining the fourth and the fifth IF signals so as to generate the first IF signal.

5. The optical LNB of claim 4, wherein the down-converting device further comprises an amplifier, coupled between the diplexer and the branching device.

6. The optical LNB of claim 4, wherein frequency band of the fourth IF signal is between 0.95 GHz and 3.0 GHz; frequency band of the fifth IF signal is between 3.4 GHz and 5.45 GHz.

7. The optical LNB of claim 1, wherein the branching device is a direct coupler, a T-type power divider, a resistance power divider, a Wilkinson power divider, a quadrature hybrid power divider, or a ring hybrid power divider.

* * * * *